United States Patent [19]
Izumi et al.

[11] Patent Number: 5,280,408
[45] Date of Patent: Jan. 18, 1994

[54] POWER RECEIVING AND TRANSFORMING APPARATUS

[75] Inventors: Toshiaki Izumi; Tooru Tanimizu, both of Hitachi, Japan

[73] Assignee: Hitachi, Ltd., Tokyo, Japan

[21] Appl. No.: 883,370

[22] Filed: May 15, 1992

[30] Foreign Application Priority Data

May 17, 1991 [JP] Japan .................... 3-112069

[51] Int. Cl.⁵ .................................. H02B 1/18
[52] U.S. Cl. .................... 361/620; 361/730; 361/744
[58] Field of Search .............. 336/65, 90; 200/48 R, 50 AA, C, 307; 307/112, 113, 149, 154; 361/333, 335, 393, 394, 396, 417, 419, 420, 429

[56] References Cited

U.S. PATENT DOCUMENTS

| | | | |
|---|---|---|---|
| 3,780,354 | 12/1973 | Sharp | 361/335 |
| 3,842,321 | 10/1974 | Caton | 200/50 AA |
| 4,233,643 | 11/1980 | Iverson et al. | 361/344 |
| 4,677,524 | 6/1987 | Shiraishi et al. | 361/335 |
| 4,710,850 | 12/1987 | Jahn et al. | 361/333 |
| 5,057,971 | 10/1991 | Hautvast et al. | 361/394 |

Primary Examiner—Gerald P. Tolin
Attorney, Agent, or Firm—Antonelli, Terry, Stout & Kraus

[57] ABSTRACT

A transformer apparatus whose transformer and a plurality of circuit-breakers are individually accommodated in a plurality of different casings. The casings are stacked one above each other in a plurality of stages with gaps between two subsequent casings and between the casing in the lowermost stage and the floor surface on which the apparatus is mounted. When a specific casing among the plurality of casings which is in an intermediate stage is to be dismounted, support columns are disposed on the outside of the specific casing with their respective ends inserted into the relevant gaps in such a manner that the support columns support the upper subsequent casing, thereby enabling the intermediate casing to be dismounted and remounted.

9 Claims, 4 Drawing Sheets

POWER RECEIVING AND TRANSFORMING APPARATUS

BACKGROUND OF THE INVENTION

1. Field of the Invention

The present invention relates to a transformer apparatus and, more particularly, to a transformer apparatus which may be suitably used as equipment in an electric power substation.

2. Description of the Related Art

An electric power substation generally includes electric equipment such as a gas-blast circuit-breaker, a transformer, a plurality of enclosed switchboards, and circuit-breakers provided on the switchboards. The gas-blast circuit-breaker receives power from a generator, and the transformer lowers the voltage of the received power. The power whose voltage has been lowered is supplied through the enclosed switchboards and the switchboard circuit-breakers to various loads.

In a conventional substation, however, not much consideration has been given to reducing the size of the installation area. Hence, electrical equipment, such as a gas-blast circuit-breaker, a transformer and enclosed switchboards, is installed on a horizontal surface. Such horizontal arrangement of electrical equipment requires a relatively large size installation area, and also requires a support structure to be built for the purpose of introducing power from a generating station to the gas-blast circuit-breaker. Another disadvantage is that electrical equipment, which is heavy, has to be moved or dismounted and remounted with difficulty each time the equipment is to be checked, for example, after a fault has occurred. Such equipment of a substation is described, for example, in Japanese Patent Laid-Open No. 60-62806.

SUMMARY OF THE INVENTION

An object of the present invention is to provide a transformer apparatus capable of reducing the size of the installation area thereof, and facilitating the dismounting and remounting of electric equipment.

In order to achieve the above object, the present invention provides a transformer apparatus as a first means for overcoming the above-stated problems. The transformer apparatus comprises a transformer; high-voltage electrical equipment for supplying power from a high-voltage distribution line to the transformer and low-voltage electrical equipment for supplying the output power of the transformer to a group of low-voltage distribution lines, the high-voltage electrical equipment and the low-voltage electrical equipment being electrically connected with each other through the transformer. The transformer apparatus further comprises a plurality of casings in which the transformer, the high-voltage electrical equipment and the low-voltage electrical equipment are individually accommodated, with the casings being stacked one above each other in a plurality of stages with gaps between two subsequent casings and between the casing in the lowermost stage and a floor surface on which the apparatus is mounted. Support members are adapted to be disposed on the outside of a specific casing among those casings in any intermediate stage and the lowermost stage in such a manner that the support members extend from the upper gap on the upper side of the specific casing to the lower gap on the lower side of the specific casing while defining a casing dismounting space between the upper and lower gap. The support members have their respective ends insertable into the upper and lower gaps, with the ends of the support members inserted i the lower gap being fixed to either the top surface of a subsequent casing located below the specific casing or the floor surface, and the ends of the support members inserted in the upper gap supporting the bottom surface of another subsequent casing located above the specific casing.

The present invention provides another transformer apparatus as a second means for overcoming the problems. The transformer apparatus comprises, a transformer, high-voltage electrical equipment for supplying power from a high-voltage distribution line to the transformer, and a plurality of pieces of low-voltage electrical equipment for supplying the output power of the transformer to a group of low-voltage distribution lines. The high-voltage electrical equipment and the plurality of pieces of low-voltage electrical equipment is electrically connected with each other through the transformer. The transformer apparatus further comprises: a plurality of casings in which the transformer, the high-voltage electrical equipment and the plurality of pieces of low-voltage electrical equipment are individually accommodated, with the casing being stacked one above each other in a plurality of stages with gaps between two subsequent casings and between the casing in the lowermost stage and a floor surface on which the apparatus is mounted. Support members are adapted to be disposed on the outside of a specific casing among those casings which are not the casing in the uppermost stage in such a manner that the support members extend from the upper gap on the upper side of the specific casing to the lower gap on the lower side of the specific casing while defining a casing dismounting space between the upper and lower gaps. The support members have respective ends which are insertable into the upper and lower gaps, with the ends of the support members inserted into the lower gap being fixed to either the top surface of a subsequent casing located below the specific casing or the floor surface, and the ends of the support members inserted in the upper gap supporting the bottom surface of another subsequent casing located above the specific casing.

The present invention provides still another transformer apparatus as a third means for overcoming the aforementioned problems, with the transformer apparatus comprising a transformer high-voltage electrical equipment for supplying power from a high-voltage distribution line to the transformer, and low-voltage electrical equipment for supplying the output power of the transformer to a group of low-voltage distribution lines. The high-voltage electrical equipment and the low-voltage electrical equipment is electrically connected with each other through the transformer. The transformer apparatus further comprises a plurality of casings in which the transformer, the high-voltage electric equipment and the low-voltage electric equipment are individually accommodated, with the casings being stacked one above each other in a plurality of stages with gaps between two subsequent casings and between the casing in the lowermost stage and a floor surface on which the apparatus is mounted. Support columns are adapted to be disposed at four corners on the outside of a specific casing among those casings in any intermediate stage and the lowermost stage in such a manner that the support columns extend from the upper gap on the upper side of the specific casing to the lower gap on the lower side of the specific casing while defining a casing dismounting space between the upper and lower gaps. The support columns have respective ends insertable into the upper and lower gaps, with the ends of the support columns inserted in the lower gap being fixed to either the top surface of a subsequent casing located below the specific casing or the floor surface, and the ends of the support columns inserted in the upper gap supporting the bottom surface of another subsequent casing located above the specific casing.

The present invention provides a further transformer apparatus as a fourth means for overcoming the aforementioned problems, with the transformer apparatus comprising a transformer, high-voltage electrical equipment for supplying power from a high-voltage distribution line to the transformer, and a plurality of pieces of low-voltage electrical equipment for supplying the output power of the transformer to a group of low-voltage distribution lines. The high-voltage electrical equipment and the plurality of pieces of low-voltage electrical equipment is electrically connected with each other through the transformer. The transformer apparatus further comprises a plurality of casing in which the transformer, the high-voltage electric equipment and the plurality of pieces of low-voltage electrical equipment are individually accommodated, with the casings being stacked one above each other in a plurality of stages with gaps between two subsequent casings and between the casing in the lowermost stage and a floor surface on which the apparatus is mounted. Support columns are adapted to be disposed at four corners on the outside of a specific casing among those casings which are not the casing in the uppermost stage in such a manner that the support columns extend from the upper gap on the upper side of the specific casing to the lower gap on the lower side of the specific casing while defining a casing dismounting space between the upper and lower gaps. The support columns respective ends which are insertable into the upper and lower gaps, with the ends of the support columns inserted in the lower gap being fixed to either the top surface of a subsequent casing located below the specific casing or the floor surface, and the ends of the support columns inserted in the upper gap supporting the bottom surface of another subsequent casing located above the specific casing.

According to the present invention, a fifth means for avoiding the above noted problem one of the first, second, third and fourth means is characterized in that the high-voltage electrical equipment includes a high-voltage circuit-breaker, and the low-voltage electrical equipment includes a switchboard and a switchboard circuit-breaker with the high-voltage circuit-breaker being accommodated in a casing arranged in the uppermost stage. The transformer is accommodated in a casing arranged in the lowermost stage.

A sixth means comprising one of the first to fifth means is characterized in that the casings accommodating the various electrical equipment of the apparatus comprise box-shaped bodies.

A seventh means comprising one of the first to fifth means is characterized in that the casings accommodating the various electrical equipment of the apparatus comprise frame-shaped bodies.

An eighth means comprising one of the first to seventh means is characterized in that the respective dimensions of the casings accommodating the various electrical equipment of the apparatus are substantially the same with each other at least in height, and the respective dimensions of the upper and lower gaps respectively on the upper and lower sides of each casing are substantially the same.

A ninth means comprising one of the first to eighth means is characterized in that the casing accommodating the various electric equipment of the apparatus include cooling fins provided on side walls thereof.

Since the transformer, the high-voltage electrical equipment and the low-voltage electrical equipment are individually accommodated in a plurality of casings which are stacked one above each other in a plurality of stages, it is possible to reduce the size of the installation area. When any of the casings which is not the casing in the uppermost stage is to be dismounted, support members or support columns are disposed on the outside of the specific casing in such a manner that one of the respective ends of each support member or column is fixed to either the top surface of a subsequent casing below the specific casing or the floor surface on which the apparatus is mounted, and the other ends support the bottom surface of another subsequent casing above the specific casing, thereby enabling the specific casing to be easily dismounted.

DESCRIPTION OF THE PREFERRED EMBODIMENTS

Figure 1:
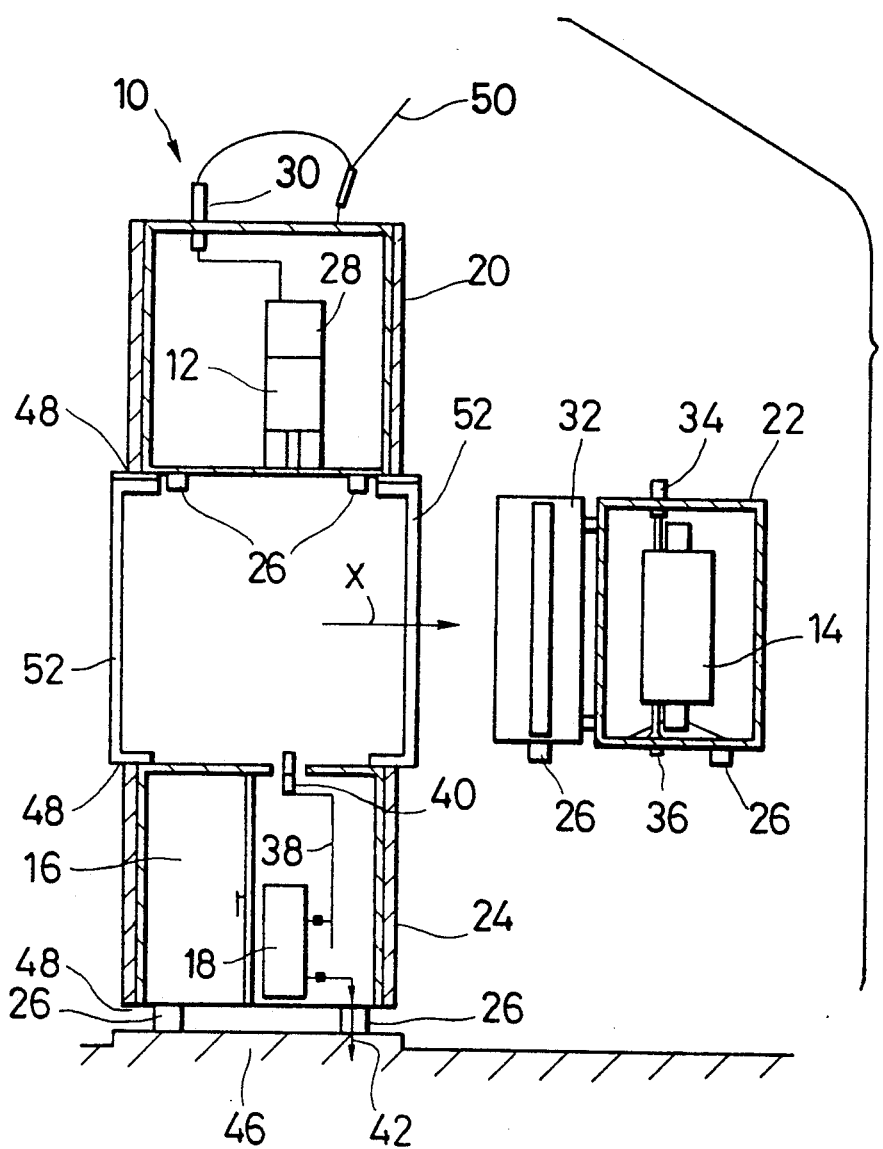
FIG. 1 is a diagram for illustrating a manner of dismounting a casing of a transformer apparatus according to the present invention.
Figure 2:
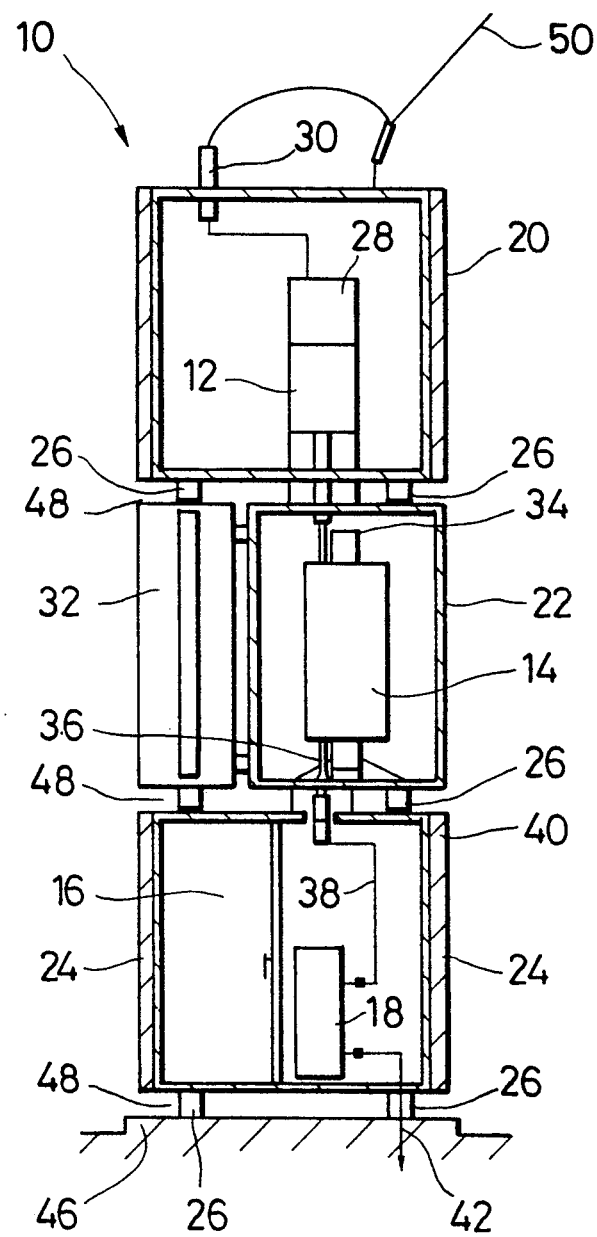
FIG. 2 is a vertical sectional view of the transformer apparatus according to the present invention.
Figure 3:
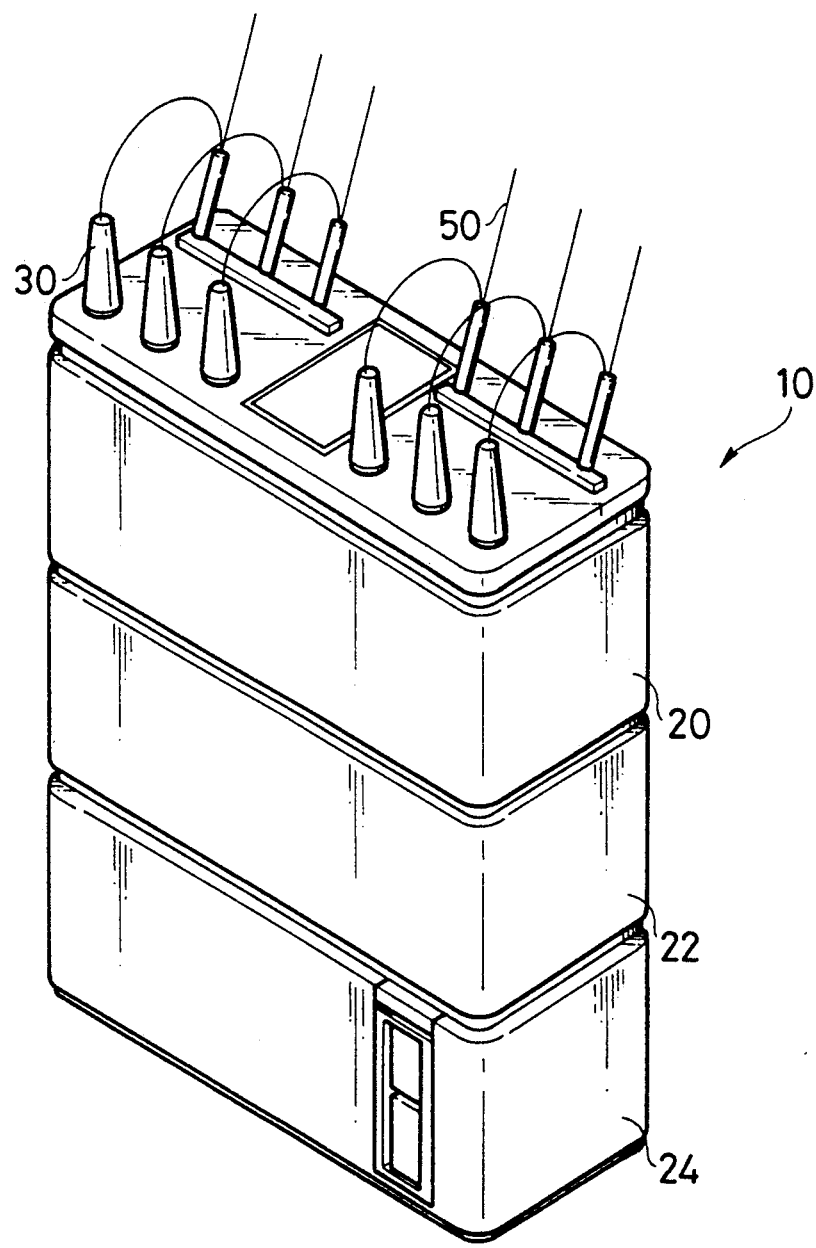
FIG. 3 is a perspective view showing the external appearance of the transformer apparatus according to the present invention.
Figure 4:
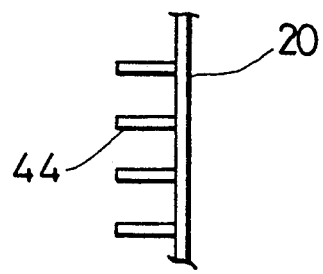
FIG. 4 is a fragmentary sectional view of an example of a container.

Referring to FIGS. 1 to 3, an electric power substation 10 includes electrical equipment such as an extra-high-voltage circuit-breaker 12, a transformer 14, enclosed switchboards 16, and switchboard circuit-breakers 18. The pieces of electrical equipment are accommodated in a plurality of different box-shaped casings 20, 22 and 24, as will be described below. The casings 20 22 and 24 have substantially the same length, width and height. Liners 26 of substantially the same configuration and dimension are fixed to four corner portions of the bottom surface of each of the casings 20, 22 and 24. The extra-high-voltage circuit-breaker 12 is accommodated in the casing 20, and is arranged such that the circuit-breaker 12 can be connected via a disconnector section 28 to bushings 30. The transformer 14 is accommodated in the casing 22 together with a radiator 32, and is arranged such that the transformer 14 can be cooled by the radiator 32. The primary and the secondary sides of the transformer 14 are provided with conductive connecting-terminals 34 and 36, respectively. The enclosed switchboards 16 and the switchboard circuit-breakers 18 are accommodated in the casing 24. These circuit-breakers 18 are connected via a power bus 38 to a connecting terminal 40, and are also connected with cables 42 for supplying power to various loads. As shown in FIG. 4, cooling fins 44 are provided on the respective wall surfaces of the casings 20, 22 and 24.

The electrical equipment having the above construction is installed in the substation 10 in the following manner. The casing 24 is mounted on a floor surface 46, then, the casing 22 is stacked above the casing 24, and finally, the casing 20 is stacked above the casing 22, thereby stacking the plurality of casings 20, 22 and 24 one above each other in a plurality of stages. In this stacked condition of the casings 20, 22 and 24, a gap 48 is provided between the bottom surface of the casing 24 in the lowermost stage and the floor surface 46, another gap 48 is provided between the casing 24 and the casing 22 in the intermediate stage, and still another gap 48 is provided between the casing 22 and the casing 20 in the uppermost stage. Thereafter, the bushings 30 are connected with distribution cables 50, the extra-high-voltage circuit-breaker 12 is connected with the primary-side connecting terminal 34 of the transformer 14, and the secondary-side connecting terminal 36 of the transformer 14 is connected with the connecting terminal 40, thereby electrically connecting the circuit-breaker 12 and the switchboard circuit-breakers 18 with each other through the transformer 14.

Thus, according to this embodiment of the present invention, since the casings 20, 22 and 24, each accommodating the associated electrical equipment, are stacked one above each other in a plurality of stages, it is possible to reduce the size of the installation area. Furthermore, since the extra-high-voltage circuit-breaker 12 is located at a relatively high position, there is no need to provide a supporting structure.

When, as shown in FIG. 1, the transformer 14 is dismounted or removed in the direction of the arrow X for the purpose of, for example, maintenance, checking or operation required after the occurrence of a fault, support columns 52 are disposed, as shown in FIG. 1, with the support columns 52 being disposed at positions substantially at four corners on the outside of the intermediate casing 22 with the respective ends of the support columns 52 being inserted into the gaps 48 on the upper and lower sides of the intermediate casing 22. Each of the support columns 52 has a substantially U-shaped cross-section. When the support columns 52 are disposed as described above, they extend between the gaps 48 on the upper and lower sides of the casing 22 while defining a casing dismounting or removal space between these gaps 48. When the respective ends of the support columns 52 are inserted in the relevant gaps 48 as described above, the ends in the lower gap 48 are mounted on the top surface of the casing 24, and the ends in the upper gap 48 support the bottom surface of the casing 20. In the above-described condition, therefore, the casing 20 in the uppermost stage 20 is supported by the support columns 52 at the four-corner position. Accordingly, when the casing 22 is moved in the X direction indicated by the arrow in FIG. 1, only the casing 22 can be dismounted without moving the casing 20.

When dismounting or removing the casing 22, if the support members 52 are disposed at four-corner positions on either depthwise side of the casing 22, the casing 22 can be dismounted or removed by moving the casing 22 in the lateral side direction indicated by the arrow X in FIG. 1. Further, since the casings 20, 22 and 24 have substantially the same dimensions, the casing 24 can be dismounted or removed by causing the same support columns 52 to support the casing 22 in the following manner. The support columns 52 are disposed with their respective ends inserted into the gap 48 on the upper side of the casing 24 and the gap 48 on the lower side of the casing 24. Dismounting or removal of a casing is, of course, performed after wires connecting together the respective pieces of electrical equipment accommodated in the casings have been disconnected.

Although in the above-described embodiment the casings accommodating the various pieces of electrical equipment comprise box-shaped casings, the casings may comprise frame-shaped bodies. Further, if each casing to be dismounted or removed is dismounted or removed by moving the casing in a certain fixed direction, the support columns 52 may comprise, instead of column-shaped members, plate-shaped members. Still further, the enclosed switchboards 16 and the switchboard circuit-breakers 18 may be accommodated in mutually different casings. In this case, also, the adoption of an arrangement where casings are stacked one above each other in a plurality of stages makes it possible to reduce the size of the installation area. Further, the manner of accommodating the various pieces of electrical equipment in the casings is not limited to that described above (in which the circuit-breaker 12 is arranged in the uppermost stage and the transformer 14 is arranged in the lower subsequent stage). The stage position of the various pieces of electrical equipment may be appropriately changed in accordance with the place of installation and/or the method of wiring.

Figure 5:
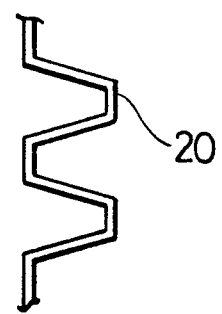
FIG. 5 is a fragmentary sectional view of another example of a container.

As shown in FIG. 5, the casings 20, 22 and 24 may have wave-shaped wall surfaces so as to reinforce the respective casings.

As described above, according to the present invention, various pieces of electrical equipment are accommodated in a plurality of casings stacked one above each other in a plurality of stages. When support members are disposed on the outside of a specific casing, the specific casing can be dismounted or removed and remounted. Thus, it is possible to reduce the size of the installation area, and to smoothly dismount or remove and remount a part of the electric equipment.

What is claimed is:

1. A power receiving and transformer apparatus comprising:

a transformer;

high-voltage electrical equipment for supplying power from a high-voltage distribution line to said transformer;

low voltage electrical equipment for supplying the output power of said transformer to a group of low-voltage distribution lines, said high-voltage electrical equipment and said low voltage electrical equipment being electrically connected with each other through said transformer;

a plurality of casings for respectively individually accommodating said transformer, said high-voltage electrical equipment and said low-voltage electrical equipment, said casings being stacked one above each other in a plurality of stages with gaps between two adjacent stacked casings and between the casing in a lowermost stage and a floor surface on which the apparatus is mounted; and support members adapted to be disposed on an exterior of a specific casing among the casings in any intermediate stage and the lowermost stage of the stacked casings in such a manner that said support members extend from an upper gap on an upper side of said specific casing to a lower gap on a lower side of said specific casing so as to define a casing removal space between said upper and lower gaps, said support members having ends adapted to be insertable into said upper and lower gaps, wherein the ends of said support members inserted in said lower gap are mounted on one of a top surface of an adjacent casing located below said specific casing or said floor surface, and wherein the ends of said support members inserted in said upper gap support a bottom surface of an adjacent casing located above said specific casing.

2. A power receiving and transformer apparatus comprising:

a transformer;

high-voltage electrical equipment for supplying power from a high-voltage distribution line to said transformer;

a plurality of pieces of low-voltage electrical equipment for supplying the output power of said transformer to a group of low-voltage distribution lines, said high-voltage electrical equipment and said plurality of pieces of low voltage electrical equipment being electrically connected with each other through said transformer;

a plurality of casings for respectively individually accommodating said transformer, said high-voltage electrical equipment and said plurality of pieces of low-voltage electrical equipment, said casings being stacked one above each other in a plurality of stages with gaps between adjacent casings and between a casing in the lowermost stage and a floor surface on which the apparatus is supported; and support members adapted to be disposed on an exterior of a specific casing among the stacked casings other than the casing in the uppermost stage in such a manner that said support members extend from an upper gap on an upper side of said specific casing to a lower gap on a lower side of said specific casing so as to define a casing removal space between said upper and lower gaps, wherein said support members have respective ends adapted to be inserted into said upper and lower gaps, the ends of said support members adapted to be inserted into said lower gap being mounted on either a top surface of an adjacent casing located below said specific casing or on said floor surface, and wherein the ends of said support members are adapted to be inserted in said upper gap supporting a bottom surface of an adjacent casing located above said specific casing.

3. A power receiving and transformer apparatus comprising:

a transformer;

high-voltage electrical equipment for supplying power from a high-voltage distribution line to said transformer;

low-voltage electrical equipment for supplying the output power of said transformer to a group of low-voltage distribution lines, said high-voltage electrical equipment being electrically connected with each other through said transformer;

a plurality of casings for respectively individually accommodating said transformer, said high-voltage electrical and said low-voltage electrical equipment, said casings being stacked one above each other in a plurality of stages with gaps between two adjacent casings and between a casing in a lowermost stage and a floor surface on which the apparatus is supported; and support columns adapted to be disposed at four corners on an exterior of a specific casing among the stacked casings in any intermediate stage and the lowermost stage in such a manner that said support columns extend from an upper gap on an upper side of said specific casing to a lower gap on a lower side of said specific casing so as to define a casing removal space between said upper and lower gaps, said support members having respective ends thereof adapted to be inserted into said upper and lower gaps, the ends of said support columns adapted to be inserted in said lower gap are mounted to one of the top surface of an adjacent casing located below said specific casing or said floor surface, and wherein the ends of said support columns are adapted to be inserted in said upper gap supporting a bottom surface of an adjacent casing located above said specific casing.

4. A power receiving and transformer apparatus comprising:

a transformer;

high-voltage electrical equipment for supplying power from a high-voltage distribution line to said transformer;

a plurality of pieces low voltage electrical equipment for supplying the output power of said transformer to a group of low-voltage distribution lines, said high-voltage electrical equipment and said plurality of pieces of low voltage electrical equipment being electrically connected with each other through said transformer;

a plurality of casings for respectively individually accommodating said transformer, said high-voltage electrical equipment and said plurality of pieces of low-voltage electrical equipment, said casings being stacked one above each other in a plurality of stages with gaps between adjacent casings and between a casing in the lowermost stage and a floor surface on which said apparatus is supported; and support columns adapted to be disposed at four corners on an exterior of said specific casing among the stacked casings other than the casing in the uppermost in such a manner that said support columns extend from an upper gap on an upper side of said specific casing to a lower gap on a lower side of said specific casing so as to define a casing removal space between said upper and lower gaps, wherein said support columns have respective ends adapted to be insertable into said upper and lower gaps, the ends of said support columns adapted to be inserted in said lower gap are mounted on one of a top surface of an adjacent casing located below said specific casing or said floor surface, and wherein the ends of said support columns adapted to be inserted in said upper gap support a bottom surface of an adjacent casing located above said specific casing.

5. A power receiving and transformer apparatus according to one of claim 1, 2, 3 or 4, wherein said high-voltage electrical equipment includes a high-voltage circuit breaker, and said low-voltage electrical equipment includes a switchboard and a switchboard circuit-breaker, said high-voltage circuit-breaker being accommodated in a casing arranged in the uppermost stage, said transformer being accommodated in a casing arranged in the lowermost stage.

6. A power receiving and transformer apparatus according to one of claims 1, 2, 3 or 4, wherein said casings accommodating said electrical equipment are fashioned as box-shaped bodies.

7. A power receiving and transformer apparatus according to one of claim 1, 2, 3 or 4, wherein said casings accommodating said electrical equipment are fashioned as frame-shaped bodies.

8. A power receiving and transformer apparatus according to one of claims 1, 2, 3 or 4, wherein respective dimensions of said casings accommodating said electrical equipment are substantially the same at least in height, and respective dimensions of the upper and lower gaps on the upper and lower sides of each casing are substantially the same.

9. A power receiving and transformer apparatus according to one of claims 1, 2, 3 or 4, wherein said casings accommodating said electrical equipment each include cooling fins provided on side walls of the respective casings.

* * * * *